United States Patent [19]
Dukatz et al.

[11] Patent Number: 5,547,242
[45] Date of Patent: Aug. 20, 1996

[54] LATCH/UNLATCH INDICATOR FOR VEHICLE SEAT-TO FLOOR LATCH MECHANISM

[75] Inventors: Matthew E. Dukatz, Bloomfield Hills; Charles E. Harland, Livonia; Fred C. Kresky, Rochester Hills; Jay P. McCarthy, Livonia; Stephen A. Sharples, Northville, all of Mich.

[73] Assignees: Atoma International, Inc., Newmarket, Canada; Chrysler Corporation, Auburn Hills, Mich.

[21] Appl. No.: 387,425

[22] Filed: Feb. 10, 1995

[51] Int. Cl.⁶ .................................................. B60N 2/44
[52] U.S. Cl. ...................... 296/65.1; 74/523; 74/528; 74/543; 116/283; 297/463.1
[58] Field of Search ............... 296/63, 65.1; 297/463.1; 74/527, 528, 543, 557, 523; 292/56; 116/283, 281

[56] References Cited

U.S. PATENT DOCUMENTS

5,372,398 12/1994 Aneiros et al. ..................... 296/65.1

*Primary Examiner*—David M. Mitchell
*Assistant Examiner*—Kia M. Robinson
*Attorney, Agent, or Firm*—Cushman Darby & Cushman, L.L.P.

[57] ABSTRACT

Actuating structure is provided for manually moving hook members mounted on a rigid support structure. The rigid support structure supports a portion of a cushioned seat structure of a vehicle seat for use in a vehicle having a floor surface. The hook members are mounted on the rigid support structure for movement between (1) an operative position engaged in hooked relationship with anchor members of the floor surface so as to detachably fixedly retain the rigid support structure and the portion of the seat structure when mounted thereon in a fixed operative position on the floor surface and (2) an inoperative position disposed above the operative position thereof so as to enable the rigid support structure and the portion of the seat structure when mounted thereon to be moved relatively over the floor surface. The actuating structure is constructed and arranged to move the hook members between the operative and inoperative positions thereof. The actuating structure includes a manually releasable locking mechanism constructed and arranged to selectively lock the hook members in one of the operative and inoperative positions thereof, and indicating structure operatively associated with the locking mechanism and movable between a first position providing visual indication that the locking mechanism and the hook members are disposed in a fully locked position and a second position providing visual indication that the locking mechanism and the hook members are in a position other than a fully locked position.

16 Claims, 5 Drawing Sheets

LATCH/UNLATCH INDICATOR FOR VEHICLE SEAT-TO FLOOR LATCH MECHANISM

BACKGROUND OF THE INVENTION

This invention relates to improvements in removable vehicle seats, and in particular, to indicators which visually indicate (1) when an easily removable vehicle seat is either securely latched to the floor of the vehicle in an operative position or locked in a position to be rolled to, and removed from, the opening of the vehicle and (2) when the vehicle seat is in an unsafe, unlocked position.

Conventional removable vehicle seats include a seat cushion mounted to a riser assembly which provides the proper seat cushion height for optimal occupant comfort. Conventional riser assemblies for such seats provide a method of retaining the seat to the floor of the vehicle by means of latches or hook members. Removal of the seat is achieved by unlatching the seat from the floor, then lifting and carrying the seat out of the vehicle to a place of storage. Recently, it has been proposed to provide an easily removable vehicle seat which may be securely latched to the floor of the vehicle in an operative position via latches or hook members, or rolled to the opening of the vehicle while the hook members are disposed in an inoperative position so as to minimize lifting of the seat upon removal. Such seats have been disclosed in U.S. Pat. No. 5,372,398 and include a locking mechanism for locking the hook members in either the operative or inoperative position thereof. It has been found that it may be difficult to determine whether the hook members are locked fully in the desired position, which may create an unsafe condition.

Accordingly, a need exists to provide an indication to the operator when the hook members are in a fully locked position, whether it be the operative latched position or inoperative, unlatched position.

SUMMARY OF THE INVENTION

An object of the present invention is to fulfill the above need. In accordance with the principles of the present invention, the objective is obtained by providing actuating structure for manually moving hook members mounted on a rigid support structure. The rigid support structure supports a portion of a cushioned seat structure of a vehicle seat for use in a vehicle having a floor surface. The hook members are mounted on the rigid support structure for movement via the actuating structure between (1) an operative position engaged in hooked relationship with anchor members of the floor surface so as to detachably fixedly retain the rigid support structure and the portion of the seat structure when mounted thereon in a fixed operative position on the floor surface and (2) an inoperative position disposed above the operative position thereof so as to enable the rigid support structure and the portion of the seat structure when mounted thereon to be moved relatively over the floor surface. The actuating structure is constructed and arranged to move the hook members between the operative and inoperative positions thereof. The actuating structure includes a manually releasable locking mechanism constructed and arranged to selectively lock the hook members in one of the operative and inoperative positions thereof, and indicating structure operatively associated with the locking mechanism and movable between a first position providing visual indication that the locking mechanism and the hook members are disposed in a fully locked position and a second position providing visual indication that the locking mechanism and the hook members are in a position other than a fully locked position.

Another object of the present invention is the provision of structure of the type described which is simple in construction, effective in operation and economical to manufacture and maintain.

These and the other objects of the present invention will become apparent during the course of the following detailed description and appended claims.

The invention may be best understood with reference to the accompanying drawings wherein an illustrative embodiment is shown.

DETAILED DESCRIPTION OF THE INVENTION

Figures 1, 1A:
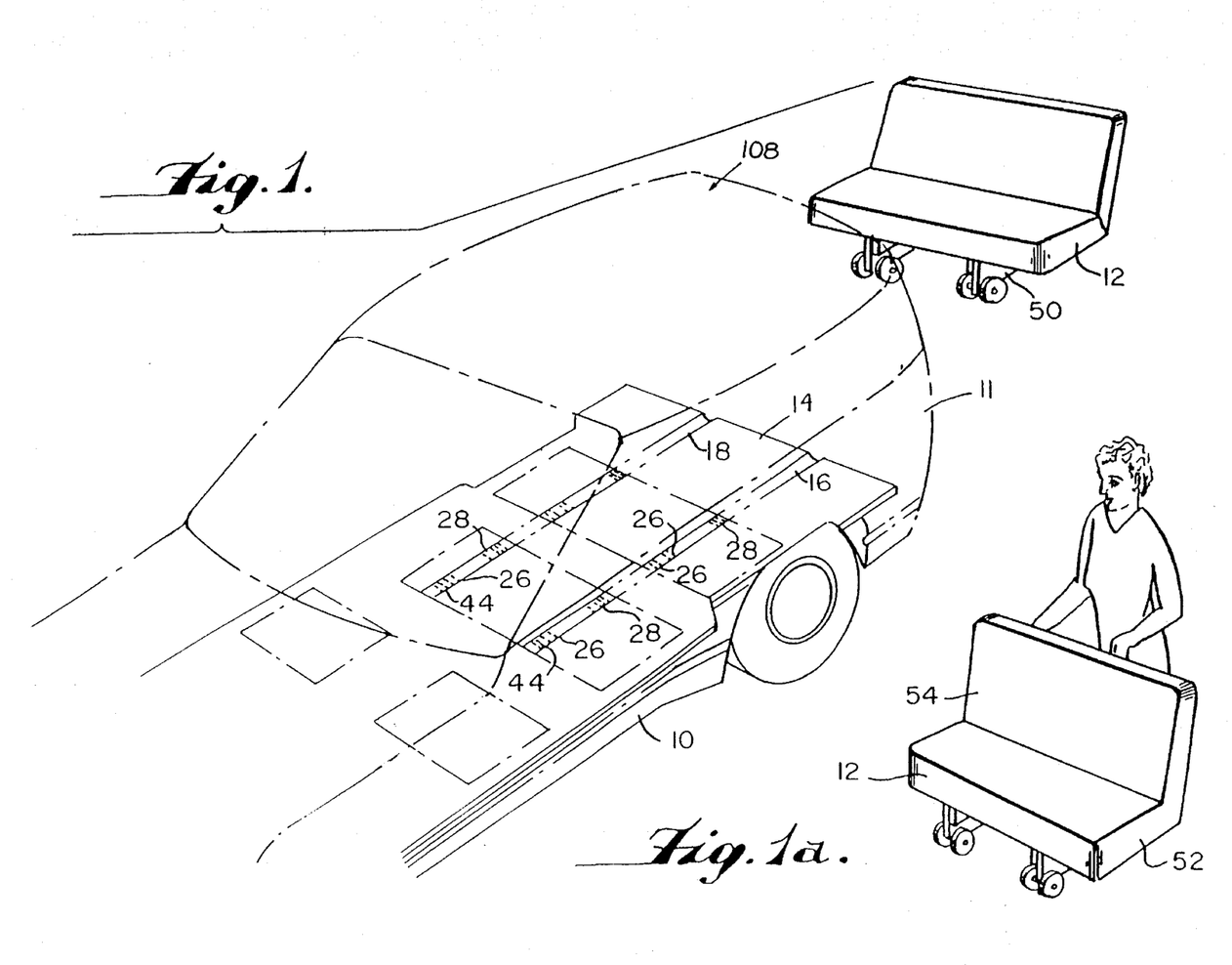
FIG. 1 is a perspective view of a removable seat assembly, including riser structure embodying the principles of the present invention, shown after removal from a vehicle.
FIG. 1a is a perspective view of a seat assembly of the present invention shown being pushed to a storage area after being removed from a vehicle.

Referring to the drawings, particularly to FIG. 1, a vehicle 10 is shown having a body 11 in which a removable seat assembly 12 may be inserted. The body 11 has a floor 14 for supporting seat assembly 12. In the illustrated embodiment, the floor 14, as shown, may support two seat assemblies. However, it can be appreciated that additional or fewer seat assemblies may be provided depending upon the type, size and configuration of the vehicle. When the seat assembly 12 is removed from the vehicle, the floor 14 may be used to support cargo.

Figure 2:
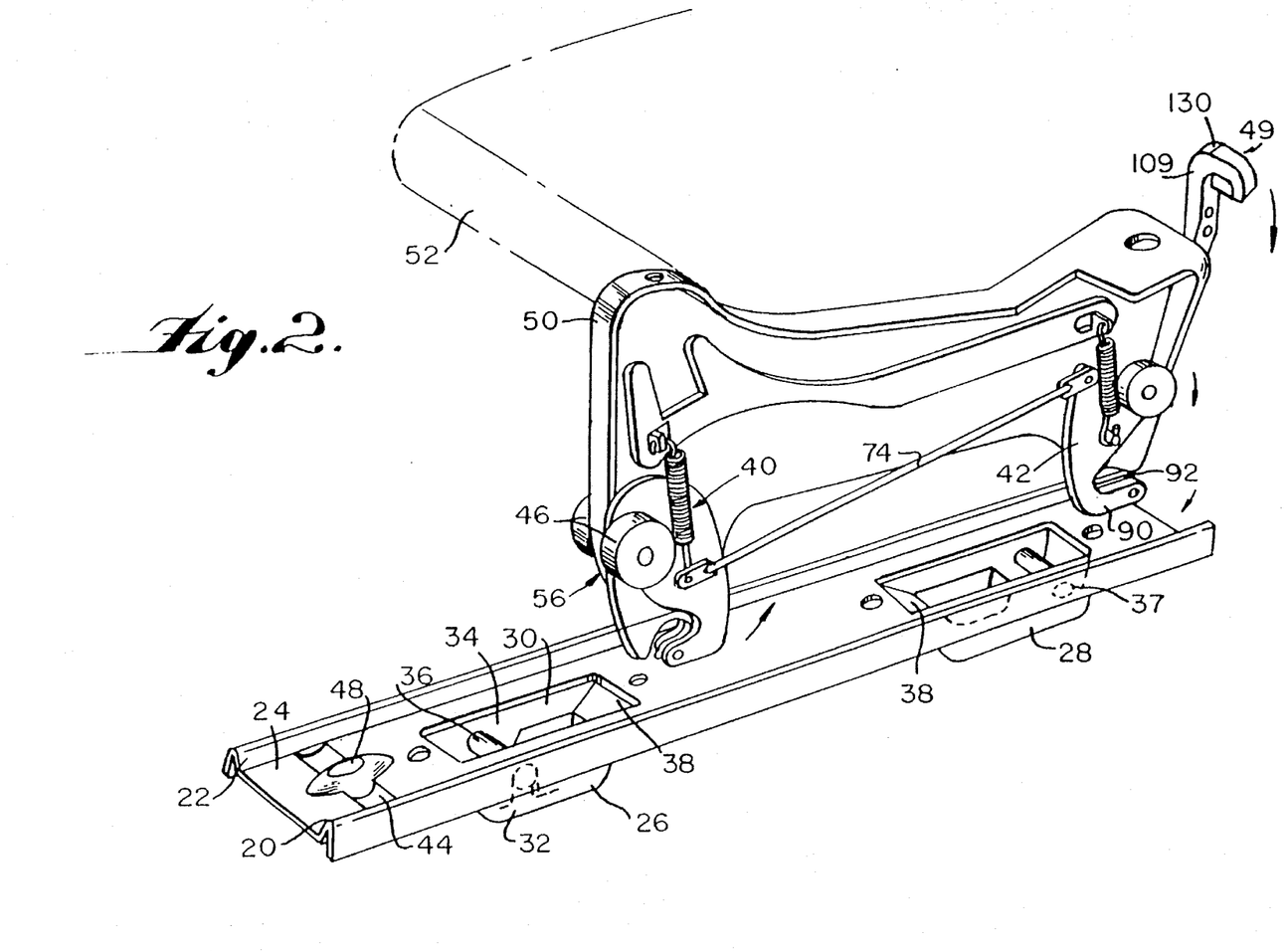
FIG. 2 is a perspective view of a riser support structure embodying the principles of the present invention, about to be engaged with a vehicle floor, shown with a portion of the floor and seat assembly removed for clarity of illustration.

In the illustrated embodiment, the floor 14 includes first and second guide tracks, respectively indicated at 16, 18. The guide tracks 16, 18 extend in the longitudinal direction of the vehicle 10 and are disposed in parallel so as to accommodate the width of the seat assembly 12. Each track 16, 18 is defined by side edges 20, 22 and surface 24 which faces upwardly (FIG. 2). The side edges 20, 22 protrude above the floor 14, the function of which will become apparent below.

Each track 16, 18 includes a plurality of wells which are used to secure the seat assembly to the floor 14. As shown in FIG. 1, one seat assembly 12 requires four wells for the mounting thereof, two front wells 26 and two rear wells 28, with respect to the longitudinal axis of the vehicle. One front well 26 is disposed in front of one rear well 28 in respective tracks 16, 18. In the illustrated embodiment, each track includes six wells to accommodate various seating combinations. Thus, different combinations of wells may be used depending on the desired spacing of the vehicle seats.

Figure 3:
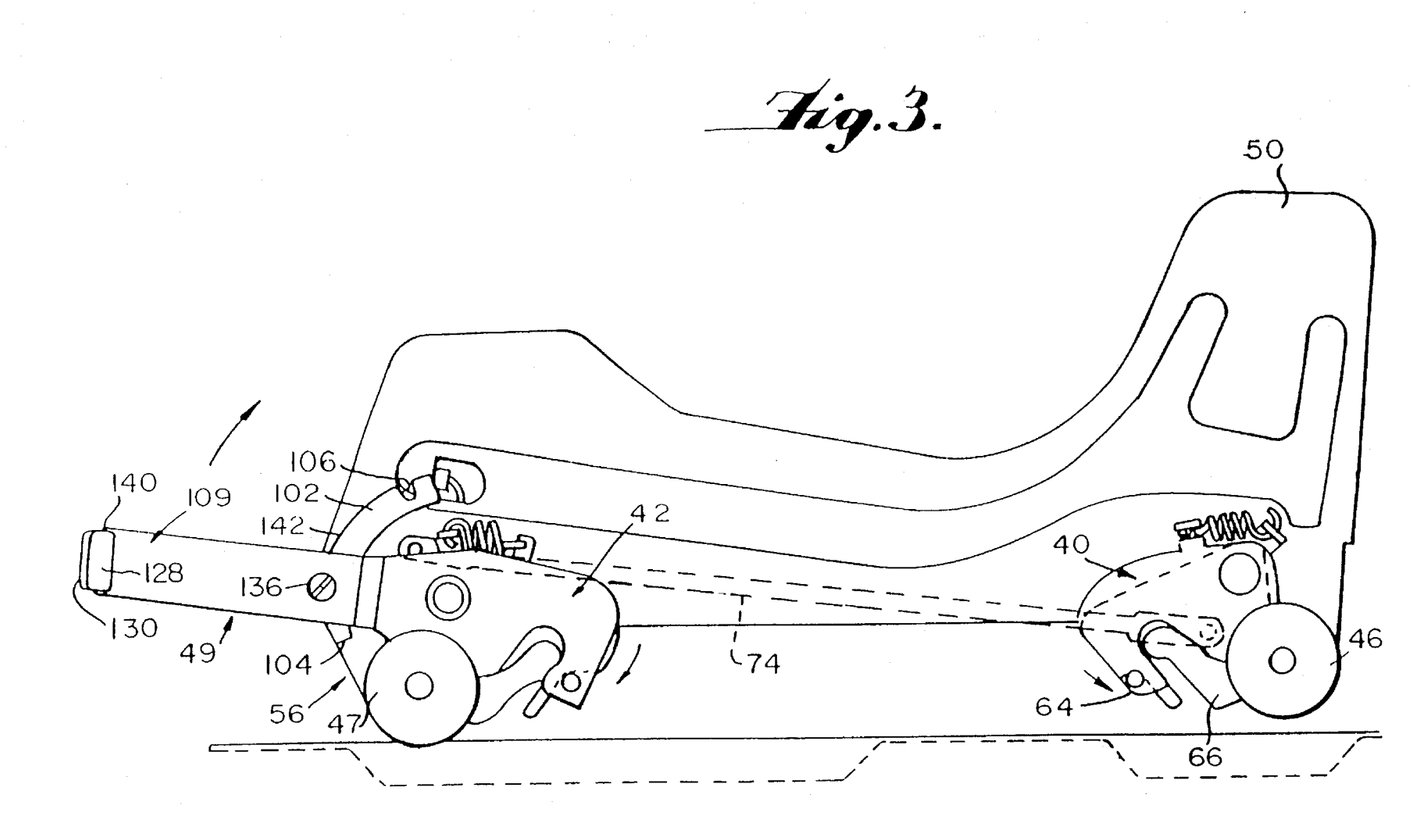
FIG. 3 is a rear elevational view of the riser support structure embodying the principles of the present invention shown in an unsafe, unlocked position, with indicator structure shown in a position extending from a surface of the handle structure.

As shown in FIG. 2, each well 26, 28 is defined in surface 24 of tracks 16, 18 defining opening 30. Each well has a width slightly smaller than the width of surface 24. Each well 26, 28 has a bottom surface 32 and side walls 34. The wells 26, 28 extend below the floor 14 of the vehicle. In addition, each front well 26 includes a striker pin 36 and each rear well 28 includes a striker pin 37 at one end thereof. The striker pins 36, 37 are disposed perpendicularly to the longitudinal axis of each track 16, 18 and extend the width of each well 26, 28. The striker pins 36, 37 are fixedly mounted slightly below surface 24 of each track inside walls 34 of the wells 26, 28. Opposite the striker pins 36, 37, each well has a tapered surface 38 which aids in guiding latch or hook members 40, 42 of the seat assembly 12 into the well, which will become more apparent below. The tracks 16, 18 may be formed separately from the wells if desired. If guide tracks are not provided, the wells 26, 28 may be disposed below the sheet metal floor of the vehicle, with the striker pins being disposed above the well and above the level of the floor as shown in FIG. 3.

As shown in FIG. 2, an offset portion 43 is defined on each side edge 20 and 22 of each track 16, 18. Each portion includes recesses 44 therein. In the illustrated embodiment, a pair of recesses 44 are associated with each well such that one wheel of the seat assembly engages an associated recess 44 to aid in correctly locating a latching position of the forward seat assembly 12, which will become more apparent below.

Referring to drawings, a seat assembly 12 is shown. The seat assembly 12 is of the type disclosed in U.S. Pat. No. 5,372,398, the disclosure of which is hereby incorporated into the present specification by this reference. The seat assembly 12 includes a pair of transversely spaced, rigid riser support structures 50 (FIG. 1). A seat cushion 52 and back cushion 54 are mounted on the riser support structures 50. The seat cushion 52 and back cushion 54 constitute a cushioned seat structure.

Each riser support structure 50 includes a latch/release assembly, generally indicated at 56, mounted thereon constructed and arranged in accordance with U.S. Pat. No. 5,372,398. Each latch/release assembly includes a front latch or hook member 40, a pair of front wheel members or wheels 46 mounted thereon, a rear latch or hook member 42, a pair of rear wheel members or wheels 47 mounted thereon and actuating structure or mechanism 49 operatively connected with the hook members to simultaneously move the same. Each latch/release assembly 56 is used to lock the seat assembly 12 within the tracks 16, 18 and used to enable the seat assembly 12 to be rollingly moved when not in the locked position. The latch/release assemblies 56 of each riser support structure 50 are configured similarly.

Hook portion 64 is defined at the distal end the rear hook member 40. When in an operative locking position, the hook portions 64 are disposed adjacent to a protruding portion 66 extending downwardly from a bottom surface of the riser support structure 50. The protruding portion 66 includes a cutout 70 defining downwardly facing surface 71, the function of which will become more apparent below. In a similar manner, hook portion 90 is defined at the distal end the rear hook member 42. When in an operative locking position, the hook portion 90 is disposed adjacent to a second protruding portion 92 extending downwardly from the bottom of the riser support structure 50. The second protruding portion 92 includes a notch 94 defining downwardly facing surface 93, the function of which will become more apparent below.

A bracket 102 is affixed to the riser support structure 50 and includes a blunt end 104 and a slot portion 106 defining surfaces used to lock the actuating mechanism 49 of the latch/release assembly 56 in two distinct positions, which will become more apparent below.

Figure 5:
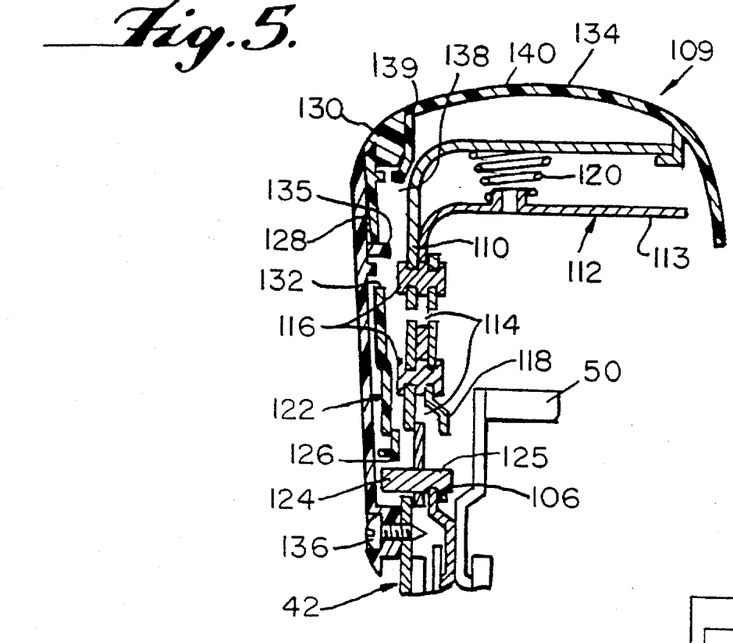
FIG. 5 is an enlarged cross-sectional view of the handle structure taken along line 5-5 in FIG. 4.

The actuating mechanism 49 includes a connecting rod 74 which couples the forward hook member 40 to the rear hook member 42, for simultaneous movement. The actuating mechanism 49 also includes actuating or handle structure, generally indicated at 109, fixed to an elongated portion 110 of the rear hook member 42 (FIG. 5). The handle structure 109 defines a manual actuator for moving the hook members 40 and 42. As shown in FIG. 5, a generally L-shaped slidable member 112, defining a manually releasable locking mechanism and having a handle 113, is associated with the elongated portion 110 of hook member 42. The slidable member 112 includes slots 114 for receiving an associated pin 116. The pins 116, defining protrusions, are fixed to the elongated portion 110. A guide 118, which is fixed to the rigid support structure 50, is coupled to the pins 116 opposite the elongated portion 110 to guide the linear movement of the slidable member 112, as will become more apparent below. A spring 120 is disposed between the elongated portion 110 and the slidable member 112 to normally bias the slidable member 112 downwardly, as shown in FIG. 5, into contact with the pins 116.

Indicating structure, generally indicated at 122, is disposed generally adjacent to the slidable member 112 and is coupled thereto via locking member or pin 124, for movement with the slidable member 112. End 125 of locking pin 126 extends so as to engage slot 106 to lock the hook members 40, 42 in their operative position, as will become apparent below.

Figure 6:
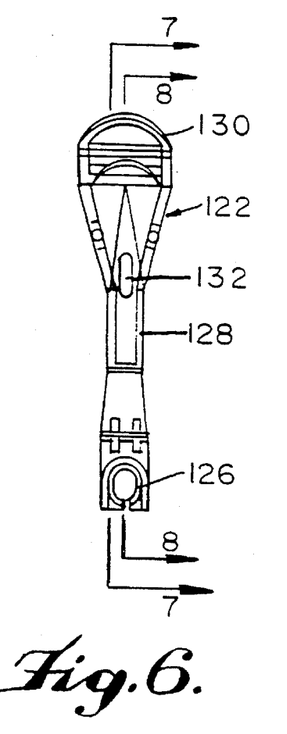
FIG. 6 is a front elevational view of the indicator structure provided in accordance with the principles of the present invention.
Figure 7:
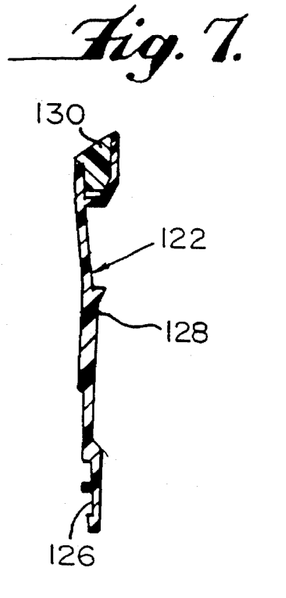
FIG. 7 is a cross-sectional view taken along the line 7—7 in FIG. 6.
Figure 8:
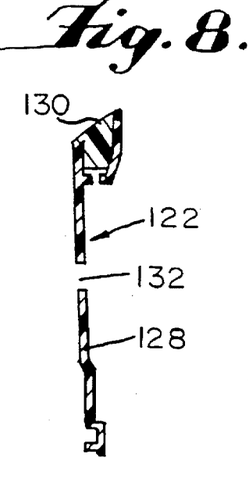
FIG. 8 is a cross-sectional view taken along the line 8—8 in FIG. 6.

As shown in FIGS. 6–8, the indicating structure 122, preferably molded from plastic or other suitable materials, includes an arm member 128 and a button 130 coupled to a distal end thereof. The arm member is preferably red in color so as to be highly visible to an operator when extended, as will become apparent below. The proximal end of the arm member 128 is coupled to the locking pin 124 at slot 126. A generally central portion of the arm member 128 includes a slot 132 for limiting travel of the indicating structure 122, as will become apparent below.

The handle structure 109 includes a housing 134 coupled to the rear hook member 42 by screw 136. The housing is preferably molded from plastic and is preferably black in color. A chamber 138, defined between the housing 134 and the elongated portion 110, has an opening 139 for accommodating reciprocal movement of the indicating structure 122 within the chamber 138. An upper portion of the housing 134 is coupled to the elongated portion 110. The housing 134 includes a protrusion 135 which is cooperable with surfaces of the slot 132 to limit travel of the indicating structure 122.

The operation of the handle structure 109 will be appreciated below. Upon grasping handle 113 and compressing spring 120, the slidable member 112 moves upwardly along the longitudinal axis of the elongated portion 110. The elongated portion 110 can now be rotated either upwardly or downwardly to place the wheels in an inoperative or operative position. Once in the proper position, the handle 113 is released and the spring 120 biases the slidable member 112 downwardly to lock the elongated portion 110 in place by the engagement of pin 124 with slot 106 or with blunt end 104.

With references to the FIGURES, the installation of the seat assembly 12 into the vehicle will be described. The seat assembly 12 is lifted into the opening 108 of the vehicle 10 with the latch or hook members 40, 42 disposed in an inoperative position and the wheel pairs 46, 47 disposed in an operative position. When the hook members 40, 42 are in the inoperative position, the front pair of wheels 46 and the rear pair of wheels 47 are disposed in an operative position below hook portions 64 and 90 of the hook members 40 and 42, respectively. When the wheels are disposed in the operative position, the handle structure 109 of the actuating mechanism 49 is locked in place since pin 124 is engaged with blunt end 104. In this position, indicator structure 122 is in its retracted within opening 139 such that button 130 is flush with surface 140 of the housing 138 with an upper surface of slot 132 contacting protrusion 135, thereby providing visual indication to the operator that the hook members 40 and 42 are locked in their inoperative positions. Since the housing 138 and the button 130 are black in color, a generally smooth, continuous black peripheral housing surface is seen by the operator. Thereafter, the front wheels 46 on the riser support structures 50 are guided into respective tracks 16, 18. Upon pushing the seat assembly forward into the vehicle, both front and rear wheel pairs 46 and 47 roll along each track 16, 18 within edges 20 and 22.

The seat assembly 12 is pushed further along the tracks 16, 18 and is in the proper latching position within the vehicle 10 with the forward hook member 40 being disposed above the front well 26 and the rear hook member 42 being disposed above the rear well 28, when the wheels are felt to engage recesses 44 in tracks 16, 18.

Handle 113 is then engaged to compress spring 120 and to release the pin 124 from engagement with the blunt end 104. The handle 113 and thus the elongated portion 110 of the rear hook member 42 can then be rotated upwardly to secure the seat assembly 12 in the vehicle 10. Thus, raising of the handle structure 109 causes the rear hook member 42 to move downwardly, as shown by the arrows in FIG. 3. Connecting rod 74 of the actuating mechanism 49 transmits the motion of the rear hook member 42 to the forward hook member 40 to simultaneously move the forward hook member 40 downwardly in an opposite direction. The forward and rear hook members 40, 42 slide along the tapered surface 38 of respective wells 28, 26 until they are positioned beneath the striker pins 36, 37.

Figure 4:
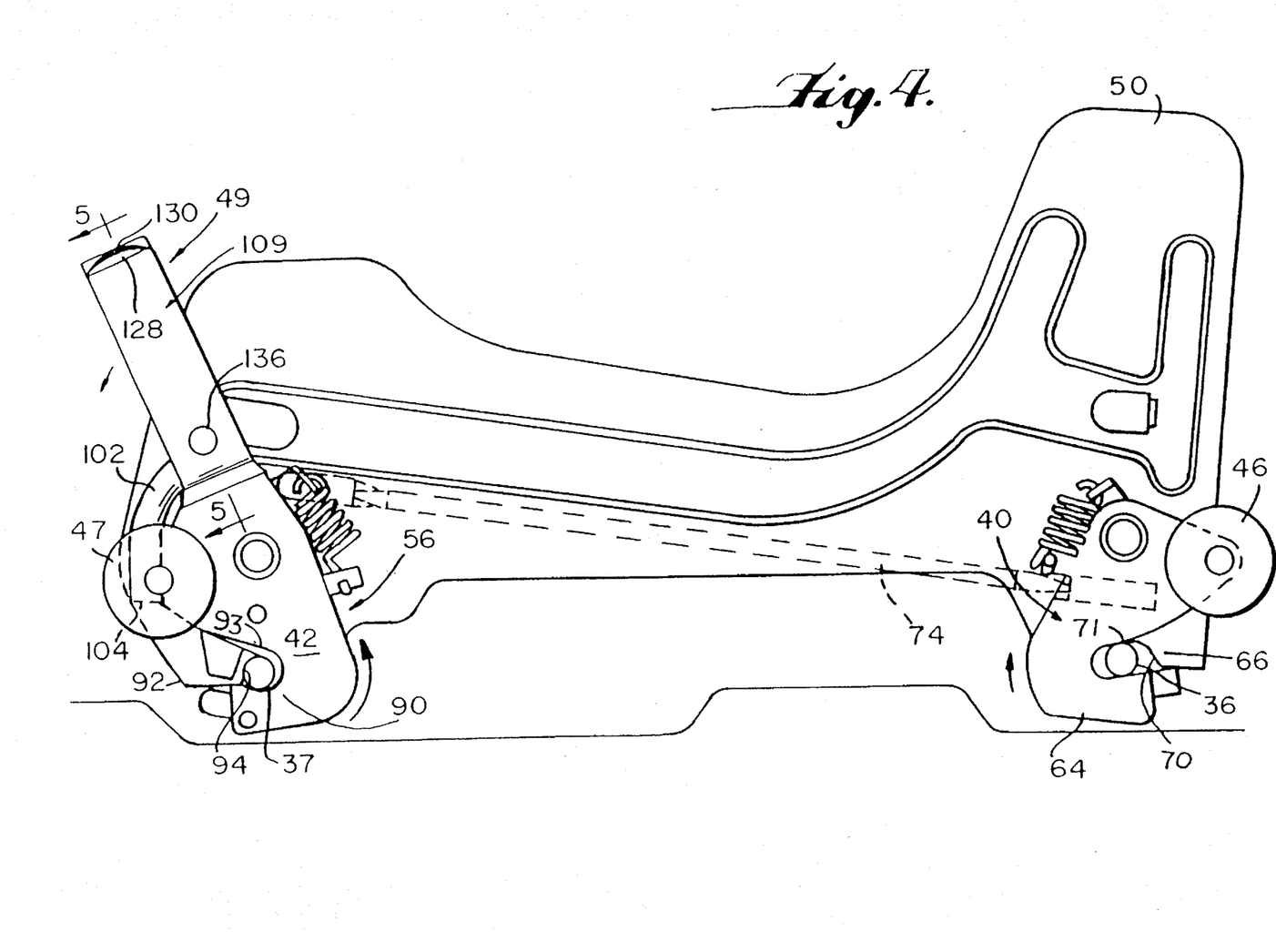
FIG. 4 is a rear elevational view of the riser support structure embodying the principles of the present invention shown engaged with a vehicle floor with the hook members locked in an operative position and with the indicator structure in a position flush with a surface of the handle structure.

As shown in FIG. 4, the forward hook member 40 is fully engaged when the hook portions 64 thereof and downwardly facing surface 71 of the riser support structure 50 are in substantially surrounding relation with the striker pin 36. Similarly, the rear hook member 42 is fully engaged when the hook portions 90 thereof and downwardly facing surface 93 are in substantially surrounding relation with striker pin 37. When the hook members 40, 42 are in the engaged or operative position, the wheels 46, 47 are disposed above the hook members 40 and 42 respectively in an inoperative position. The weight of the seat assembly is now supported by the vehicle floor and striker pins. The handle 113 and thus the elongated portion 110 of the rear hook member 42 are locked in place when the pin 124 is engaged with slot 106. In this position, indicator structure 122 is again in its retracted position in opening 139 such that button 130 is flush with surface 140 of the housing 138, providing the visual indication noted above, signaling the operator that the hook members 40 and 42 are locked in their operative positions.

In certain circumstances, it is difficult to determine whether the hook members 40, 42 are locked in either their operative or inoperative position, which may create an unsafe condition. Thus, in accordance with the principles of the present invention, the indicating structure 122 is constructed and arranged to move with the slidable member 112 such that if pin 124 is not engaged with either slot 106 or blunt end 104 and is in contact with surface 142 of bracket 102 (FIG.3), the slidable member 112 and indicating structure 122 are forced upwardly against the bias of spring 120. Thus, the button 130 together with a portion of arm member 128 extends out of opening 139 and beyond surface 140 of the housing 134 with a lower surface of slot 132 contacting protrusion 135. Since the portion of the arm member 128 extending from beyond surface 140 is red in color, a visual indication is provided to the operator signalling that the hook members 40 and 42 are in a position other than a fully locked position. The button 130 will be flush with surface 140 of the housing only when the hook members 40 and 42 are locked fully in their operative or inoperative positions.

To remove the seat assembly 12, the handle 113 is engaged to release the pin 126 from the slot 106 and then moved downwardly which in turn releases the forward and rear hook members 40, 42 from the respective striker pins 36, 37 while simultaneously moving the wheels 46, 47 to their operative position. The hook members 40, 42 move to an inoperative position above the wheels 46, 47. The weight of the seat assembly is now supported by the wheels.

The seat assembly 12 can then be rolled to the vehicle opening 108 along the tracks 16, 18. Of course, guide tracks need not be provided and, alternatively, the seat assembly 12 may be rolled along the floor 14 of the vehicle to be removed. The seat assembly 12 is then lifted out of the vehicle opening 108 and placed on the ground in a position to be rolled to a storage area.

It can be appreciated that the latch/release assembly and handle structure of the seat assembly can be utilized with various vehicle seats configurations.

It can be seen that the present invention provides a simple and effective means of indicating to the operator that a seat assembly is in a safe or unsafe condition.

It thus will be appreciated that the objects of this invention have been fully and effectively accomplished. It will be realized, however, that the foregoing preferred embodiment of the present invention has been shown and described for the purpose of illustrating the structural and functional principles of the present invention and is subject to change without departure from such principles. Therefore, this invention includes all modifications encompassed within the spirit of the following claims.

What is claimed is:

1. Actuating structure for manually moving hook members mounted on a rigid support structure, said rigid support structure for supporting a portion of a cushioned seat structure of a vehicle seat for use in a vehicle having floor means, said hook members being mounted on said rigid support structure for movement between (1) an operative position engaged in hooked relationship with anchor members of the floor means so as to detachably fixedly retain the rigid support structure and the portion of the seat structure when mounted thereon in a fixed operative position on the floor means and (2) an inoperative position disposed above the operative position thereof so as to enable the rigid support structure and the portion of the seat structure when mounted thereon to be moved relatively over said floor means, said actuating structure being constructed and arranged to move said hook members between the operative and inoperative positions thereof, said actuating structure including:

a manually releasable locking mechanism constructed and arranged to selectively lock said hook members in one of the operative and inoperative positions thereof, and indicating structure operatively associated with said locking mechanism and movable between a first position providing visual indication that said locking mechanism and said hook members are disposed in a fully locked position and a second position providing visual indication that said locking mechanism and said hook members are in a position other than a fully locked position.

2. The actuating structure according to claim 1, wherein manual rotation of said actuating structure moves said hook members to one of the operative and inoperative positions, said locking mechanism including a slidable member operatively coupled to one of said hook members so as to be moved linearly with respect thereto and be rotatable therewith, said slidable member having a manually engageable handle at one end thereof and a locking member fixed to the other end thereof, said actuating structure including a spring normally biasing said slidable member towards a locking position, said locking member having first and second ends, said first end of said locking member being cooperable with surfaces of said rigid support structure to lock said actuating structure with respect thereto against rotational movement, said second end of said locking member coupling said indicating structure to said slidable member.

3. The actuating structure according to claim 2, wherein said one hook member includes at least one protrusion fixed to a portion thereof, said slidable member having at least one slot therein cooperating with said protrusion so as to limit linear movement of said slidable member.

4. The actuating structure according to claim 3, further comprising a housing coupled to said one hook member and having a peripheral surface, said housing cooperating with said portion of said one hook member so as to define an open chamber between said housing and said one hook member portion, said indicating structure being mounted for movement within said chamber such that (1) when said hook members are disposed in a fully locked position with said locking member engaging said surfaces of said rigid support structure, said indicating structure is in said first position with a distal end thereof being flush with said peripheral surface of said housing and (2) when said hook members are disposed in a position other than said fully locked position, said indicating structure is in said second position, with said distal end extending beyond said peripheral surface of said housing.

5. The actuating structure according to claim 4, wherein said indicating structure comprises an arm member and a button coupled to a distal end of said arm member, a proximal end of said arm member being coupled to said locking member, said arm member including a slot therein cooperable with a protrusion defined in said housing to limit travel of said arm portion, a portion of said arm member extending beyond said peripheral surface of said housing when said indicating structure is in said second position.

6. The actuating structure according to claim 5, wherein said housing and said button are made from plastic material of like color such that a single color, continuous surface is seen by the operator when said distal end of the indicating structure is flush with said peripheral surface of said housing, and said arm member is made from a plastic material having a color different from said like color so as to provide a highly visible signal to the operator when said portion of said arm member extends beyond said peripheral surface of said housing.

7. In a riser support assembly for supporting a portion of a cushioned seat structure of a vehicle seat for use in a vehicle including floor means having upwardly facing surface means, said floor means having wells extending below said upwardly facing surface means and anchor members extending across said wells in a position one of above and below said upwardly facing surface means, said riser support assembly including rigid support structure constructed and arranged to be mounted to a portion of the seat structure and having downwardly facing surface means for engaging the anchor members of the vehicle floor means; hook members mounted on said rigid support structure for movement via actuating structure between (1) an operative position extending below the downwardly facing surface means so as to enter the wells and engage in hooked relationship with the anchor members so as to detachably fixedly retain the rigid support structure and the portion of the seat structure when mounted thereon in a fixed operative position on said floor means with said anchor members and said downwardly facing surface means in engagement and (2) an inoperative position disposed above the operative position thereof so as to enable the rigid support structure and the portion of the seat structure when mounted thereon to be moved relatively over said floor means; and wheel members mounted on the rigid support structure for movement between (1) an operative position extending below the downwardly facing surface means of the rigid support structure and the hook members when in the inoperative position thereof so as to enable the rigid support structure and the portion of the seat structure when mounted thereon to be rolled in wheel member supported relation over the upwardly facing surface means of the vehicle floor means and (2) an inoperative position disposed above the operative position thereof, said actuating structure being constructed and arranged to move said hook members between the operative and inoperative positions thereof and includes a manually releasable locking mechanism constructed and arranged to selectively lock said hook members in one of the operative and inoperative positions thereof, the improvement comprising:

indicating structure operatively associated with said locking mechanism and movable between a first position providing visual indication that said locking mechanism and said hook members are disposed in a fully locked position and a second position providing visual indication that said locking mechanism and said hook members are in a position other than a fully locked position.

8. The improvement according to claim 7, wherein manual rotation of said actuating structure moves said hook members to one of the operative and inoperative positions, said locking mechanism including a slidable member operatively coupled to one of said hook members so as to be moved linearly with respect thereto and be rotatable therewith, said slidable member having a manually engageable handle at one end thereof and a locking member fixed to the other end thereof, said actuating structure including a spring normally biasing said slidable member towards a locking position, said locking member having first and second ends, said first end of said locking member being cooperable with surfaces of said rigid support structure to lock said actuating structure with respect thereto against rotational movement, said second end of said locking member coupling said indicating structure to said slidable member.

9. The improvement according to claim 8, wherein a housing, having a peripheral surface, is coupled to said one hook member, said housing cooperating with said portion of said one hook member so as to define an open chamber between said housing and said one hook member portion, said indicating structure being mounted for movement within said chamber such that (1) when said hook members are disposed in a fully locked position with said locking member engaging said surfaces of said rigid support structure, said indicating structure is in said first position with a distal end thereof being flush with said peripheral surface of said housing and (2) when said hook members are disposed in a position other than said fully locked position, said indicating structure is in said second position, with said distal end extending beyond said peripheral surface of said housing.

10. The improvement according to claim 9, wherein said indicating structure comprises an arm member and a button coupled to a distal end of said arm member, a proximal end of said arm member being coupled to said locking member, said arm member including a slot therein cooperable with a protrusion defined in said housing to limit travel of said arm portion, a portion of said arm member extending beyond said peripheral surface of said housing when said indicating structure is in said second position.

11. The improvement according to claim 10, wherein said housing and said button are made from plastic material of like color such that a single color, continuous surface is seen by the operator when said distal end of the indicating structure is flush with said peripheral surface of said housing, and said arm member is made from a plastic material having a color different from said like color so as to provide a highly visible signal to the operator when said portion of said arm member extends beyond said peripheral surface of said housing.

12. In an easily removable vehicle seat for use with a vehicle including floor means having upwardly facing surface means, said floor means having wells extending below said upwardly facing surface means and anchor members extending across said wells in a position one of above and below said upwardly facing surface means, said vehicle seat comprising a pair of rigid support structures disposed on opposite ends of said vehicle seat and having downwardly facing surface means for engaging the anchor members of the vehicle floor means, a cushioned seat structure on said pair of rigid support structures, hook members mounted on each of said pair of rigid support structures for movement via actuating structure between (1) an operative position extending below the downwardly facing surface means of the associated rigid support structure so as to enter the wells and engage in hooked relationship with the anchor members so as to detachably fixedly retain the associated rigid support structure and hence the cushioned seat structure on said pair of rigid support structures in a fixed operative position on said floor means with said anchor members and said downwardly facing surface means in engagement and (2) an inoperative position disposed above the operative position thereof so as to enable the associated rigid support structure to be moved relatively over said floor means, and wheel members mounted on each of said pair of rigid support structures for movement between (1) an operative position extending below the downwardly facing surface means of the associated rigid support structure and the associated hook members when in the inoperative position thereof so as to enable the associated rigid support structure and hence the cushioned seat structure on said pair of rigid support structures to be rolled in wheel member supported relation over the upwardly facing surface means of the vehicle floor means and (2) an inoperative position disposed above the operative position thereof, said actuating structure being mounted on each of said pair of rigid support structures and constructed and arranged to move said hook members between the operative and inoperative positions thereof, each said actuating structure including a manually releasable locking mechanism constructed and arranged to selectively lock associated hook members in one of the operative and inoperative positions thereof, the improvement comprising:

indicating structure operatively associated with each said locking mechanism and movable between a first position providing visual indication that said locking mechanism and said hook members are disposed in a fully locked position and a second position providing visual indication that said locking mechanism and said hook members are in a position other than a fully locked position.

13. The improvement according to claim 12, wherein manual rotation of said actuating structure moves said hook members to one of the operative and inoperative positions, said locking mechanism including a slidable member operatively coupled to one of said hook members of each rigid support structure so as to be moved linearly with respect thereto and be rotatable therewith, said slidable member having a manually engageable handle at one end thereof and a locking member fixed to the other end thereof, said actuating structure including a spring normally biasing said slidable member towards a locking position, said locking member having first and second ends, said first end of said locking member being cooperable with surfaces of said rigid support structure to lock said actuating structure with respect thereto against rotational movement, said second end of said locking member coupling said indicating structure to said slidable member.

14. The improvement according to claim 13, wherein a housing, having a peripheral surface, is coupled to said one hook member, said housing cooperating with said portion of said one hook member so as to define an open chamber between said housing and said one hook member portion, said indicating structure being mounted for movement within said chamber such that (1) when said hook members are disposed in a fully locked position with said locking member engaging said surfaces of said rigid support structure, said indicating structure is in said first position with a distal end thereof being flush with said peripheral surface of said housing and (2) when said hook members are disposed in a position other than said fully locked position, said indicating structure is in said second position, with said distal end extending beyond said peripheral surface of said housing.

15. The improvement according to claim 14, wherein said indicating structure comprises an arm member and a button coupled to a distal end of said arm member, a proximal end of said arm member being coupled to said locking member, said arm member including a slot therein cooperable with a protrusion defined in said housing to limit travel of said arm portion, a portion of said arm member extending beyond said peripheral surface of said housing when said indicating structure is in said second position.

16. The improvement according to claim 15, wherein said housing and said button are made from plastic material of like color such that a single color, continuous surface is seen by the operator when said distal end of the indicating structure is flush with said peripheral surface of said housing, and said arm member is made from a plastic material having a color different from said like color so as to provide a highly visible signal to the operator when said portion of said arm member extends beyond said peripheral surface of said housing.

* * * * *